United States Patent
Yang et al.

(10) Patent No.: US 11,943,804 B2
(45) Date of Patent: Mar. 26, 2024

(54) TIMELINE FOR INTRA-USER EQUIPMENT (UE) CHANNEL MULTIPLEXING AND CANCELLATION

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/324,006

(22) Filed: May 18, 2021

(65) Prior Publication Data
US 2021/0368518 A1 Nov. 25, 2021

Related U.S. Application Data

(60) Provisional application No. 63/027,839, filed on May 20, 2020.

(51) Int. Cl.
*H04W 72/12* (2023.01)
*H04W 72/566* (2023.01)
(Continued)

(52) U.S. Cl.
CPC ...... *H04W 72/569* (2023.01); *H04W 72/1268* (2013.01); *H04W 72/23* (2023.01)

(58) Field of Classification Search
None
See application file for complete search history.

(56) References Cited

FOREIGN PATENT DOCUMENTS

WO    WO-2021231507 A1 * 11/2021 ........... H04L 1/1812

OTHER PUBLICATIONS

Apple Inc: "Remaining Issues on UCI Enhancements for eURLLC,"3GPP Draft, 3GPP TSG RAN WG1 #101-e, R1-2004222, 3rd Generation Partnership Project (3GPP), Mobile Competence Centre, 650, Route Des Lucioles, F-06921, Sophia-Antipolis Cedex, France, vol. RAN WG1, No. e-Meeting, May 25, 2020-Jun. 5, 2020, May 16, 2020 (May 16, 2020), XP051885980, 5 pages, Retrieved from the Internet: URL: https://ftp.3gpp.org/tsg_ran/WG1_RL1/TSGR1_101-e/Docs/R1-2004222.zip R1-2004222 UCI Enhancements for eURLLC.docx [retrieved on May 16, 2020].
(Continued)

*Primary Examiner* — Kouroush Mohebbi
(74) *Attorney, Agent, or Firm* — Seyfarth Shaw LLP

(57) ABSTRACT

A method for wireless communications performed by a user equipment (UE) includes receiving a low priority (LP) grant for scheduling an LP uplink transmission in a slot. The LP uplink transmission may overlap a set of high priority (HP) uplink transmissions in the slot. The method also includes determining an uplink shared channel preparation time as a function of a subcarrier spacing (SCS) configuration and a UE processing time capability based on the LP uplink transmission overlapping the set of HP uplink transmissions. The method further includes determining a time period until an expected transmission time for each respective HP uplink transmission of the set of HP uplink transmissions scheduled based on a corresponding HP grant, the time period being a function of the uplink shared channel preparation time and a time duration corresponding to a reported UE capability. The method also includes canceling the LP uplink transmission before a symbol of the LP uplink transmission overlaps an earliest HP uplink transmission of the set of HP uplink transmissions.

24 Claims, 7 Drawing Sheets

(51) Int. Cl.
*H04W 72/1268* (2023.01)
*H04W 72/23* (2023.01)

(56) References Cited

OTHER PUBLICATIONS

Ericsson: "Main Functions of Intra-UE Data-Data Prioritization", 3GPP Draft, 3GPP TSG-RAN WG2 #107, R2-1909373 (Revision of R2-1906848) Main Functions of Intra-UE Data-Data Prioritization, 3rd Generation Partnership Project (3GPP), Mobile Competence Centre, 650, Route Des Lucioles, F-06921 Sophia-Antipolis Ced, vol. RAN WG2, No. Prague, Czech, Aug. 26, 2019-Aug. 30, 2019, Aug. 15, 2019 (Aug. 15, 2019), XP051767173, 4 Pages, Retrieved from the Internet: URL:http://www.3gpp.org/ftp/tsg_ran/WG2_RL2/TSGR2_107/Docs/R2-1909373.zip.
International Search Report and Written Opinion—PCT/US2021/033181—ISA/EPO—dated Oct. 11, 2021.
Qualcomm Incorporated: "Processing Timeline Enhancements for eURLLC", 3GPP Draft, 3GPP TSG-RAN WG1 #96, R1-1903007 Processing Timeline Enhancements for eURLLC, 3rd Generation Partnership Project (3GPP), Mobile Competence Centre, 650, Route Des Lucioles, F-06921, Sophia-Antipolis Cedex, FRA, vol. RAN WG1, No. Athens, Greece, Feb. 25, 2019-Mar. 1, 2019, Feb. 16, 2019 (Feb. 16, 2019), XP051600704, 16 Pages, Retrieved from the Internet: URL: http://www.3gpp.org/ftp/tsg%5Fran/WG1%5FRL1/TSGR1%5F96/Docs/R1%2D1903007%2Ezip.
Qualcomm Incorporated: "Summary #2 of Enhancements to Scheduling/HARQ", 3GPP Draft, 3GPP TSG-RAN WG1 Meeting #99, R1-1913564, 3rd Generation Partnership Project (3GPP), Mobile Competence Centre, 650, Route Des Lucioles, F-06921 Sophia-Antipolis Cedex, France, vol. RAN WG1, No. Reno, Nevada, U.S.A, Nov. 18, 2019-Nov. 22, 2019, Nov. 25, 2019 (Nov. 25, 2019), XP051830841, 43 Pages, Retrieved from the Internet: URL: https://ftp.3gpp.org/tsg_ran/WG1_RL1/TSGR1_99/Docs/R1-1913564.zip. [retrieved on Nov. 25, 2019] sections 1-7, pages.
Vivo: "Remaining Issues on UL Data Transmission for URLLC", 3GPP Draft, 3GPP TSG RAN WG1 Meeting #92bis, R1-1806070, Remaining Issues on UL Data Transmission for URLLC, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018, XP051441284, 5 Pages, Retrieved from the Internet: URL: http://www.3gpp.org/ftp/Meetings%5F3GPP%5FSYNC/RAN1/Docs/ [retrieved on May 20, 2018] sections 2.2 and 2.3.
3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. RAN WG1. No. V16.1.0, Apr. 3, 2020, XP051893821, pp. 1-156, p. 17, line 3—p. 18, line 8, paragraph [0010], Section 9, clauses 6, 9.2.1, 10.2 and 12.
3GPP TS 38.214: "3rd Generation Partnership Project, Technical Specification Group Radio Access Network, NR, Physical Layer Procedures for Data (Release 16)", 3GPP Draft, 38214-G10, 3rd Generation Partnership Project, Mobile Competence Centre, 650, Route Des Lucioles, F-06921 Sophia-Antipolis Cedex, France, vol. RAN WG1, No. V16.1.0, Apr. 3, 2020, pp. 1-151, XP051893823.

\* cited by examiner

TIMELINE FOR INTRA-USER EQUIPMENT (UE) CHANNEL MULTIPLEXING AND CANCELLATION

CROSS-REFERENCE TO RELATED APPLICATION

The present application claims the benefit of U.S. Provisional Patent Application No. 63/027,839, filed on May 20, 2020, and titled "TIMELINE FOR INTRA-USER EQUIPMENT (UE) MULTIPLEXING AND CANCELLATION," the disclosure of which is expressly incorporated by reference in its entirety.

FIELD OF THE DISCLOSURE

Aspects of the present disclosure generally relate to wireless communications, and more particularly to techniques and apparatuses for intra-user equipment (UE) channel multiplexing and cancellation.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (uplink), as well as supporting beamforming, multiple-input multiple-output (MIMO) antenna technology, and carrier aggregation.

SUMMARY

In one aspect of the present disclosure, a method for wireless communication by a user equipment (UE) includes receiving a low priority (LP) grant for scheduling an LP uplink transmission in a slot, the LP uplink transmission overlapping a set of high priority (HP) uplink transmissions in the slot. The method further includes determining an uplink shared channel preparation time as a function of a subcarrier spacing (SCS) configuration and a UE processing time capability based on the LP uplink transmission overlapping the set of HP uplink transmissions. The method still further includes determining a time period until an expected transmission time for each respective HP uplink transmission of the set of HP uplink transmissions scheduled based on a corresponding HP grant, the time period being a function of the uplink shared channel preparation time and a time duration corresponding to a reported UE capability. The method also includes canceling the LP uplink transmission before a symbol of the LP uplink transmission overlaps an earliest HP uplink transmission of the set of HP uplink transmissions.

Another aspect of the present disclosure is directed to an apparatus for wireless communication at a UE. The apparatus includes means for receiving an LP grant for scheduling an LP uplink transmission in a slot, the LP uplink transmission overlapping a set of HP uplink transmissions in the slot. The apparatus further includes means for determining an uplink shared channel preparation time as a function of an SCS configuration and a UE processing time capability based on the LP uplink transmission overlapping the set of HP uplink transmissions. The apparatus still further includes means for determining a time period until an expected transmission time for each respective HP uplink transmission of the set of HP uplink transmissions scheduled based on a corresponding HP grant, the time period being a function of the uplink shared channel preparation time and a time duration corresponding to a reported UE capability. The apparatus also includes means for canceling the LP uplink transmission before a symbol of the LP uplink transmission overlaps an earliest HP uplink transmission of the set of HP uplink transmissions.

In another aspect of the present disclosure, a non-transitory computer-readable medium with non-transitory program code recorded thereon for wireless communication at a UE is disclosed. The program code is executed by a processor and includes program code to receive an LP grant for scheduling an LP uplink transmission in a slot, the LP uplink transmission overlapping a set of HP uplink transmissions in the slot. The program code further includes program code to determine an uplink shared channel preparation time as a function of an SCS configuration and a UE processing time capability based on the LP uplink transmission overlapping the set of HP uplink transmissions. The program code still further includes program code to determine a time period until an expected transmission time for each respective HP uplink transmission of the set of HP uplink transmissions scheduled based on a corresponding HP grant, the time period being a function of the uplink shared channel preparation time and a time duration corresponding to a reported UE capability. The program code also includes program code to cancel the LP uplink transmission before a symbol of the LP uplink transmission overlaps an earliest HP uplink transmission of the set of HP uplink transmissions.

Another aspect of the present disclosure is directed to an apparatus for wireless communication at a UE, the apparatus includes a processor, and a memory communicatively coupled with the processor and storing instructions that, when executed by the processor, cause the apparatus to receive an LP grant for scheduling an LP uplink transmission in a slot, the LP uplink transmission overlapping a set of HP uplink transmissions in the slot. Execution of the instructions also cause the apparatus to determine an uplink shared channel preparation time as a function of an SCS configuration and a UE processing time capability based on the LP uplink transmission overlapping the set of HP uplink transmissions. Execution of the instructions further cause the apparatus to determine a time period until an expected transmission time for each respective HP uplink transmission of the set of HP uplink transmissions scheduled based on a corresponding HP grant, the time period being a function of the uplink shared channel preparation time and a time duration corresponding to a reported UE capability. Execution of the instructions still further cause the apparatus to cancel the LP uplink transmission before a symbol of the LP uplink transmission overlaps an earliest HP uplink transmission of the set of HP uplink transmissions.

In one aspect of the present disclosure, a method for wireless communication by a base station includes transmitting, to a user equipment UE, an LP grant for scheduling an LP uplink transmission in a slot, the LP uplink transmission overlapping a set of HP uplink transmissions in the slot. The method further includes determining an uplink shared channel preparation time of the UE as a function of an SCS configuration and a UE processing time capability based on the LP uplink transmission overlapping the set of HP uplink transmissions. The method still further includes determining an earliest transmission time for scheduling each respective HP uplink transmission of the set of HP uplink transmissions based on a corresponding HP grant, the earliest transmission time being a function of the uplink shared channel preparation time and a time duration corresponding to a reported UE capability. The method also includes receiving, from the UE, the LP uplink transmission based on the LP grant, the LP uplink transmission cancelled before a symbol of the LP uplink transmission overlaps an earliest HP uplink transmission of the set of HP uplink transmissions.

Another aspect of the present disclosure is directed to an apparatus for wireless communication at a base station. The apparatus includes means for transmitting, to a user equipment UE, an LP grant for scheduling an LP uplink transmission in a slot, the LP uplink transmission overlapping a set of HP uplink transmissions in the slot. The apparatus further includes means for determining an uplink shared channel preparation time of the UE as a function of an SCS configuration and a UE processing time capability based on the LP uplink transmission overlapping the set of HP uplink transmissions. The apparatus still further includes means for determining an earliest transmission time for scheduling each respective HP uplink transmission of the set of HP uplink transmissions based on a corresponding HP grant, the earliest transmission time being a function of the uplink shared channel preparation time and a time duration corresponding to a reported UE capability. The apparatus also includes means for receiving, from the UE, the LP uplink transmission based on the LP grant, the LP uplink transmission cancelled before a symbol of the LP uplink transmission overlaps an earliest HP uplink transmission of the set of HP uplink transmissions.

In another aspect of the present disclosure, a non-transitory computer-readable medium with non-transitory program code recorded thereon for wireless communication at a base station is disclosed. The program code is executed by a processor and includes program code to transmit, to a user equipment UE, an LP grant for scheduling an LP uplink transmission in a slot, the LP uplink transmission overlapping a set of HP uplink transmissions in the slot. The program code further includes program code to determine an uplink shared channel preparation time of the UE as a function of an SCS configuration and a UE processing time capability based on the LP uplink transmission overlapping the set of HP uplink transmissions. The program code still further includes program code to determine an earliest transmission time for scheduling each respective HP uplink transmission of the set of HP uplink transmissions based on a corresponding HP grant, the earliest transmission time being a function of the uplink shared channel preparation time and a time duration corresponding to a reported UE capability. The program code also includes program code to receive, from the UE, the LP uplink transmission based on the LP grant, the LP uplink transmission cancelled before a symbol of the LP uplink transmission overlaps an earliest HP uplink transmission of the set of HP uplink transmissions.

Another aspect of the present disclosure is directed to an apparatus having a memory and one or more processors coupled to the memory. The processor(s) is configured to transmit, to a user equipment UE, an LP grant for scheduling an LP uplink transmission in a slot, the LP uplink transmission overlapping a set of HP uplink transmissions in the slot. The processor(s) is further configured to determine an uplink shared channel preparation time of the UE as a function of an SCS configuration and a UE processing time capability based on the LP uplink transmission overlapping the set of HP uplink transmissions. The processor(s) is still further configured to determine an earliest transmission time for scheduling each respective HP uplink transmission of the set of HP uplink transmissions based on a corresponding HP grant, the earliest transmission time being a function of the uplink shared channel preparation time and a time duration corresponding to a reported UE capability. The processor(s) is also configured to receive, from the UE, the LP uplink transmission based on the LP grant, the LP uplink transmission cancelled before a symbol of the LP uplink transmission overlaps an earliest HP uplink transmission of the set of HP uplink transmissions.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
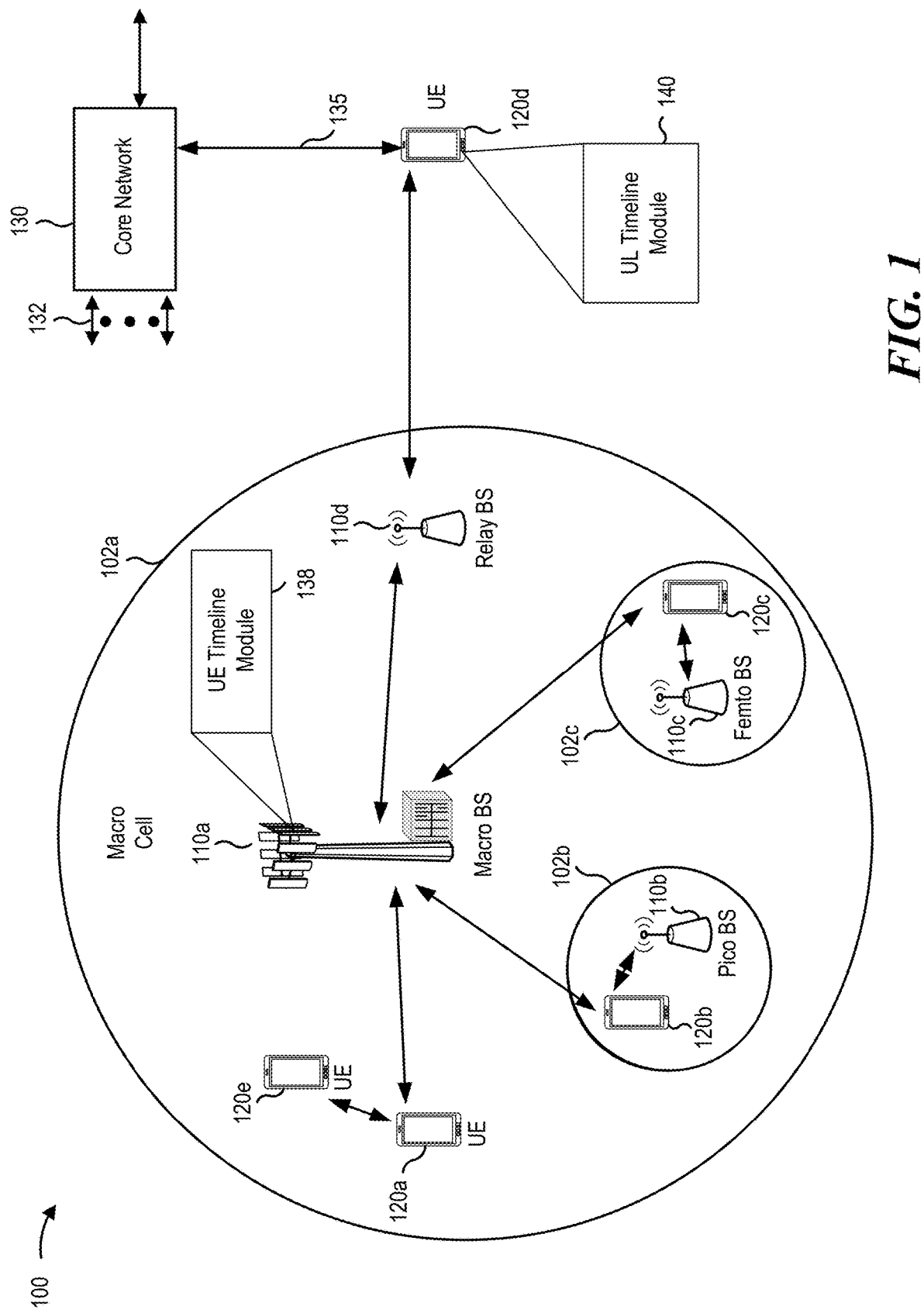
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communication systems, such as new radio (NR) access (e.g., 5G technology), may support various wireless communications services, such as enhanced mobile broadband (eMBB) targeting wide bandwidth (e.g., 80 MHz or beyond), millimeter wave (mmWave) targeting high carrier frequency (e.g., 25 GHz or beyond), massive machine-type communications (mMTC) targeting non-backward compatible MTC techniques, and/or mission critical targeting ultra-reliable low-latency communications (URLLC). The described services may include quality of service (QoS) specifications, such as latency and reliability requirements. Different transmission time intervals (TTIs) may be specified to satisfy the respective QoS specifications. In addition, the described services may co-exist in the same subframe.

In some examples, a UE may dynamically multiplex different services, such as eMBB and URLLC, in a same time-frequency resource to improve spectrum use. Some wireless standards, such as NR Release-16 and beyond, may support intra-UE multiplexing and cancellation for uplink channels. In some examples, a UE may multiplex payloads of colliding uplink channels if the colliding uplink channels have a same priority. As an example, a physical uplink control channel (PUCCH) may collide with another PUCCH of a same priority. In this example, the UE may multiplex the uplink control information (UCI) payload of the two PUCCHs, and transmit the multiplexed UCIs in one PUCCH. As another example, a physical uplink shared channel (PUSCH) may collide with another transmission, such as a PUCCH, of a same priority. In this example, the UE may piggyback the UCI of the PUCCH on the PUSCH transmission. Piggybacking refers to transmitting control information, such as the UCI, together with data in a data area of an uplink shared channel, such as the PUSCH. Piggybacking may be an example of multiplexing. In some examples, a UE may multiplex (e.g., piggyback) eMBB services, such as multiplexing eMBB UCI on an eMBB PUSCH or multiplexing the eMBB UCI on eMBB PUSCH. Aspects of the present disclosure are not limited to multiplexing eMBB services, other services may be multiplexed.

In some examples, a UE may drop a channel with a lower priority if two uplink channels of different priorities collide. The priority may be defined in a physical layer. For example, if an eMBB uplink channel has a higher priority than a URLLC uplink channel, the UE may drop the URLLC uplink channel that collides with the eMBB uplink channel.

As described, a UE may mitigate collisions between a low priority uplink channel and a high priority uplink channel by dropping the low priority uplink channel. In some examples, a low priority uplink channel may collide with two or more high priority uplink channels. Aspects of the present disclosure are directed to cancelling a low priority (LP) channel colliding with two or more high priority (HP) uplink channels. Some aspects of the present disclose are also directed to multiplexing two or more HP uplink channels. Additionally, some aspects of the present disclosure are directed determining an expected transmission time for respective HP uplink channels based on an LP channel colliding with two or more HP uplink channels.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130). The UEs 120 (e.g., 120a, 120b, 120c) may communicate with the core network 130 through a communications link 135.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by a session management function (SMF).

The BSs 110 (e.g., BSs 110a, 110b, 110c, 110d) may include a UE timeline module 138. For ease of explanation, only one BS 110a is shown as including the UE timeline module 138. The UE timeline module 138 may be a component of each BS 110. The UE timeline module 138 may work in conjunction with one or more components of the BS 110. The UE timeline module 138 may transmit, to a user equipment UE, an LP grant for scheduling an LP uplink transmission in a slot, the LP uplink transmission overlapping a set of HP uplink transmissions in the slot. The UE timeline module 138 may also determine an uplink shared channel preparation time of the UE as a function of an SCS configuration and a UE processing time capability based on the LP uplink transmission overlapping the set of HP uplink transmissions. The UE timeline module 138 may further determine an earliest transmission time for scheduling each respective HP uplink transmission of the set of HP uplink transmissions based on a corresponding HP grant, the earliest transmission time being a function of the uplink shared channel preparation time and a time duration corresponding to a reported UE capability. The UE timeline module 138 may still further receive, from the UE, the LP uplink transmission based on the LP grant, the LP uplink transmission cancelled before a symbol of the LP uplink transmission overlaps an earliest HP uplink transmission of the set of HP uplink transmissions.

The UEs 120 (e.g., UEs 120a, 120b, 120c, 120d, 120e) may include an uplink timeline module 140. For ease of explanation, only one UE 120d is shown as including the uplink timeline module 140. The uplink timeline module 140 may be a component of each UE 120. The uplink timeline module 140 may receive an LP grant for scheduling an LP uplink transmission in a slot. The uplink timeline module 140 may also determine an uplink shared channel preparation time as a function of an SCS configuration and a UE processing time capability based on the LP uplink transmission overlapping the set of HP uplink transmissions. The uplink timeline module 140 may further determine a time period until an expected transmission time for each respective HP uplink transmission of the set of HP uplink transmissions scheduled based on a corresponding HP grant. The uplink timeline module 140 may further cancel the LP uplink transmission before a symbol of the LP uplink transmission overlaps an earliest HP uplink transmission of the set of HP uplink transmissions.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband Internet-of-things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
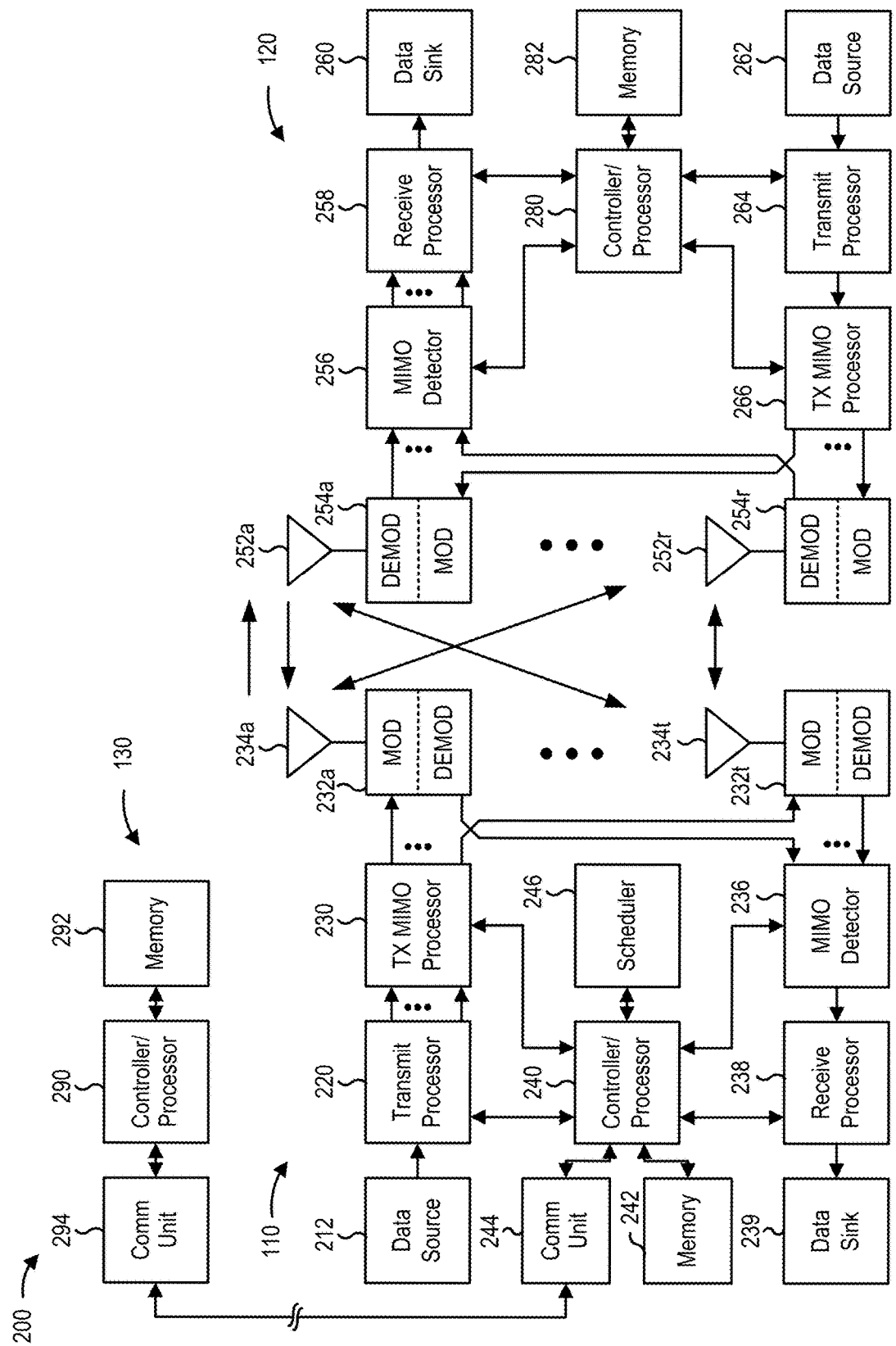
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., channel quality indicator (CQI) requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with canceling an LP uplink transmission before an initial symbol of an HP uplink transmission overlaps the LP uplink transmission, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-7 and/or other processes as described. Memories 242 and 282 may store data and program codes for the base station 110 and UE 120, respectively. A scheduler 246 may schedule UEs for data transmission on the downlink and/or uplink.

In some aspects, the UEs 120 may include means for receiving an LP grant for scheduling an LP uplink transmission in a slot; means for determining an uplink shared channel preparation time as a function of an SCS configuration and a UE processing time capability based on the LP uplink transmission overlapping the set of HP uplink transmissions; means for determining a time period until an expected transmission time for each respective HP uplink transmission of the set of HP uplink transmissions scheduled based on a corresponding HP grant; and means for canceling the LP uplink transmission before a symbol of the LP uplink transmission overlaps an earliest HP uplink transmission of the set of HP uplink transmissions.

In some aspects, a BSs 110 may include means for transmitting, to a user equipment UE, an LP grant for scheduling an LP uplink transmission in a slot; means for determining an uplink shared channel preparation time of the UE as a function of an SCS configuration and a UE processing time capability based on the LP uplink transmission overlapping the set of HP uplink transmissions; means for determining an earliest transmission time for scheduling each respective HP uplink transmission of the set of HP uplink transmissions based on a corresponding HP grant; means for receiving, from the UE, the LP uplink transmission based on the LP grant.

As indicated above, FIG. 2 is provided merely as an example. Other examples may differ from what is described with regard to FIG. 2.

Wireless communication systems, such as new radio (NR) access (e.g., 5G technology), may support various wireless communications services, such as enhanced mobile broadband (eMBB) targeting wide bandwidth (e.g., 80 MHz or beyond), millimeter wave (mmWave) targeting high carrier frequency (e.g., 25 GHz or beyond), massive machine-type communications (mMTC) targeting non-backward compatible MTC techniques, and/or mission critical targeting ultra-reliable low-latency communications (URLLC). The described services may include quality of service (QoS) specifications, such as latency and reliability requirements. Different transmission time intervals (TTIs) may be specified to satisfy the respective QoS specifications. In addition, the described services may co-exist in the same subframe.

In some examples, a UE may dynamically multiplex different services, such as eMBB and URLLC, in a same time-frequency resource to improve spectrum use. Some wireless standards, such as NR Release-16 and beyond, may support intra-UE multiplexing and cancellation for uplink channels. In some examples, a UE may multiplex payloads of colliding uplink channels if the colliding uplink channels have a same priority. As an example, a physical uplink control channel (PUCCH) may collide with another PUCCH of a same priority. In this example, the UE may multiplex the uplink control information (UCI) payload of the two PUCCHs, and transmit the multiplexed UCIs in one PUCCH. As another example, a physical uplink shared channel (PUSCH) may collide with another PUSCH of a same priority. In this example, the UE may piggyback the UCI of the PUCCH on the PUSCH transmission. Piggybacking refers to transmitting control information, such as the UCI, together with data in a data area of an uplink shared channel, such as the PUSCH. Piggybacking may be an example of multiplexing. In some examples, a UE may multiplex (e.g., piggyback) eMBB services, such as multiplexing eMBB UCI on an eMBB PUSCH or multiplexing the eMBB UCI on eMBB PUSCH. Aspects of the present disclosure are not limited to multiplexing eMBB services, other services may be multiplexed.

In some examples, a UE may drop a channel with a lower priority if two uplink channels of different priorities collide. The priority may be defined in a physical layer. For example, if an eMBB uplink channel has a higher priority than a URLLC uplink channel, the UE may drop the URLLC uplink channel that collides with the eMBB uplink channel.

As described, a UE may mitigate collisions between a low priority uplink channel and a high priority uplink channel by dropping the low priority uplink channel. In some examples, a low priority uplink channel may collide with two or more high priority uplink channels. Aspects of the present disclosure are directed to cancelling a low priority (LP) channel colliding with two or more high priority (HP) uplink channels. Some aspects of the present discloser are also directed to multiplexing two or more HP uplink channels. Additionally, some aspects of the present disclosure are directed determining an expected transmission time for respective HP uplink channels based on an LP channel colliding with two or more HP uplink channels.

In some wireless communication systems, such as NR, a base station may provide time for a UE to process an uplink transmission. A PUSCH preparation time ($N_2$) may be an example of an uplink transmission processing time. The PUSCH preparation time may be defined as a number of OFDM symbols specified for a UE from an end of a downlink transmission, such as a physical downlink control channel (PDCCH) transmission, including a grant to an earliest possible start of an uplink transmission, such as a PUSCH transmission, scheduled based on the grant. In some examples, the PUSCH preparation time ($N_2$) described above may be represented as an absolute time (e.g., seconds). In such examples, the PUSCH preparation time may be referred to as $T_{proc,2}$. In some examples, the PUSCH preparation time ($T_{proc,2}$) may correspond to a UE's processing capability. In general, the UE is not expected to perform an uplink transmission if the UE is not provided sufficient time for processing (e.g., as indicated by the $T_{proc,2}$ value for the UE, based on the UE's processing capability).

As described, the PUSCH preparation time ($T_{proc,2}$) may be a minimum time for a UE to prepare an uplink transmission, such as a PUSCH transmission, in a wireless communication system, such as an NR system. In some examples, the PUSCH preparation time ($T_{proc,2}$) may be determined based on a subcarrier spacing (SCS) configuration (μ) and also a PUSCH preparation time ($N_2$) of the uplink carrier on which the uplink transmission is scheduled. The SCS configuration (μ) may be determined based on an SCS configuration ($μ_{DL}$) of a downlink channel, such as a physical downlink control channel (PDCCH), including a grant and an SCS configuration ($μ_{UL}$) of an uplink transmission scheduled based on the grant.

In some wireless communication standards, such as NR communication standards, different UE processing capabilities may be defined. In some examples, the UE may have a first processing capability, referred to as Cap 1, and a second processing capability, referred to as Cap 2. Cap 2 corresponds to higher UE processing capability (e.g., faster processing time) and, thus, shorter times for the PUSCH preparation time ($T_{proc,2}$). For example, TABLES 1 and 2 provide example values for the SCS configuration (μ) and the PUSCH preparation time ($N_2$) used for determining the PUSCH preparation time ($T_{proc,2}$) for Cap 1 and Cap 2, respectively. In TABLES 1 and 2, the values for the PUSCH preparation time ($N_2$) represent a minimum number of symbols required for processing an uplink transmission. For example, as shown in TABLE 1, for Cap 1, if the SCS configuration (μ) is zero, then the PUSCH preparation time ($N_2$) is ten.

TABLE 1

| Cap 1 | |
|---|---|
| SCS configuration (μ) | PUSCH preparation time ($N_2$) [symbols] |
| 0 | 10 |
| 1 | 12 |
| 2 | 23 |
| 3 | 36 |

TABLE 2

| Cap 2 | |
|---|---|
| SCS configuration (μ) | PUSCH preparation time ($N_2$) [symbols] |
| 0 | 5 |
| 1 | 5.5 |
| 2 | 11 for frequency range 1 |

A UE may be limited to performing one uplink transmission per slot. Therefore, when two or more uplink transmissions are scheduled for a same slot, the UE may multiplex two or more transmissions and/or cancel one or more transmissions. As described, an HP uplink transmission may collide with an LP uplink transmission in the same slot. The collision refers to a scenario where one uplink transmission overlaps another uplink transmission in the same slot. In some examples, the UE may mitigate a collision between the HP uplink transmission and the LP uplink transmission in the slot by cancelling the LP uplink transmission.

Figure 3:
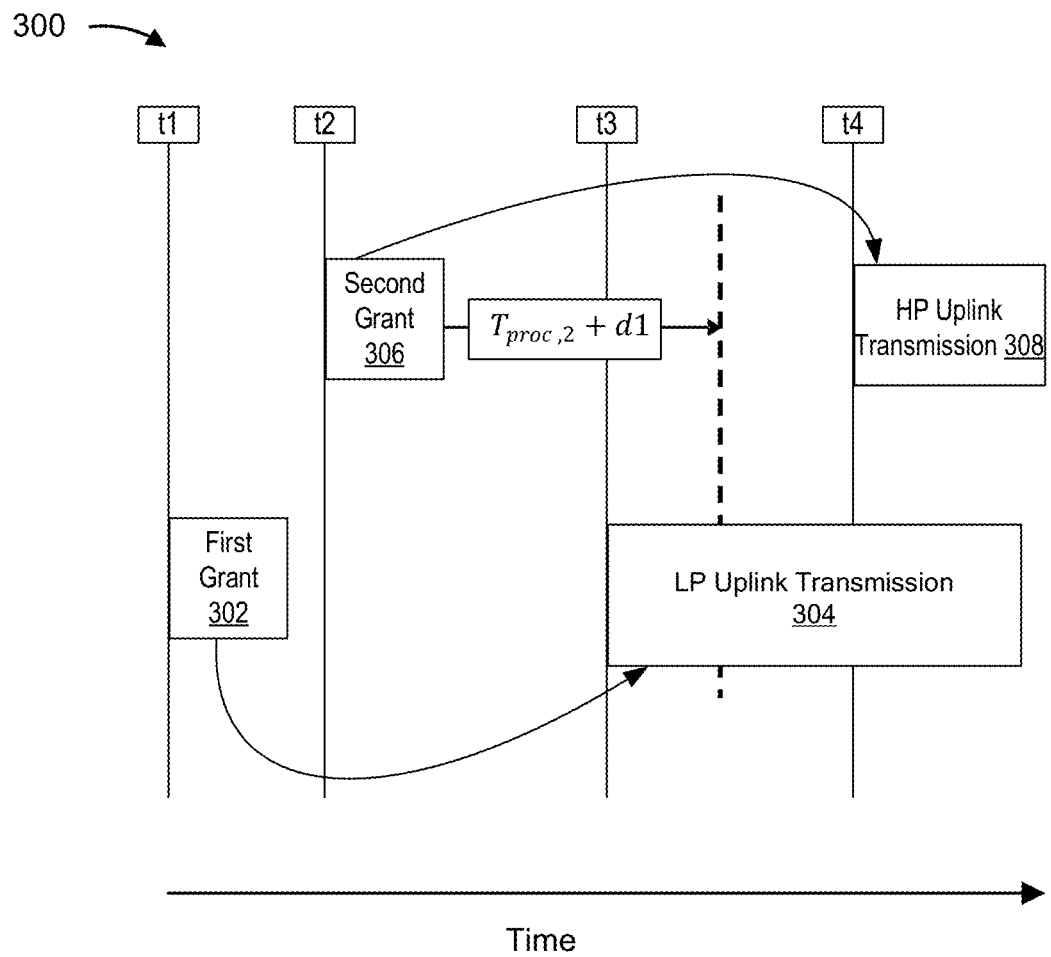
FIG. 3 is a timing diagram illustrating an exemplary timeline for cancelling a low priority (LP) uplink transmission colliding with a high priority (HP) uplink transmission, in accordance with various aspects of the present disclosure.

In some examples, an exact cancellation time may be specified for a UE to cancel an LP uplink transmission. FIG. 3 is a timing diagram illustrating an exemplary timeline 300 for a UE cancelling an LP uplink transmission 304 colliding with an HP uplink transmission 308, in accordance with various aspects of the present disclosure. The UE (not shown in FIG. 3) may be an example of a UE 120 as described with reference to FIGS. 1 and 2. As shown in FIG. 3, at time t1, the UE receives a first grant 302 scheduling an LP uplink transmission 304 at time t3. The first grant 302 may be LP downlink control information (DCI) received in a downlink control channel, such as a PDCCH. Additionally, at time t2, the UE receives a second grant 306 scheduling an HP uplink transmission 308 at time t4. The second grant 306 may be an example of HP DCI received in the downlink control channel.

In the example of FIG. 3, an expected transmission time for the HP uplink transmission 308 may be based on the PUSCH preparation time ($T_{proc,2}$) and a reported UE capability (d1). In such examples, the reported UE capability (d1) may be a time duration corresponding to 0, 1, or 2 symbols reported by the UE capability. In the example of FIG. 3, the UE expects the transmission of the HP uplink transmission 308 will not start before $T_{proc,2}$+d1 after a last symbol of the second grant 306 scheduling the HP uplink transmission 308. In the example of FIG. 3, $T_{proc,2}$ is determined based on an assumption that a first symbol of a PUSCH allocation only includes a demodulation reference signal (DM-RS) (e.g., the DM-RS is front-loaded), such that $d_{2,1}$=0.

In some examples, the UE cancels the LP uplink transmission 304 at $T_{proc,2}$+d1. In some other examples, the UE cancels the LP uplink transmission 304 before a first symbol of the HP uplink transmission 308 overlaps the LP uplink transmission 304. In the example of FIG. 3, for exemplary purposes, the first symbol of the HP uplink transmission 308 overlaps the LP uplink transmission 304 at time t4. Therefore, in the example of FIG. 3, the UE may cancel the LP uplink transmission 304 any time before time t4. Additionally, in the current example, a base station (e.g., gNB) maintains at least a threshold time ($T_{proc,2}$+d1) between an ending symbol of the second grant 306 and a starting symbol of the HP uplink transmission 308. That is, the HP uplink transmission 308 is not scheduled before $T_{proc,2}$+d1. The base station (not shown in FIG. 3) may be an example of a base station 110 as described with reference to FIGS. 1 and 2.

Figure 4:
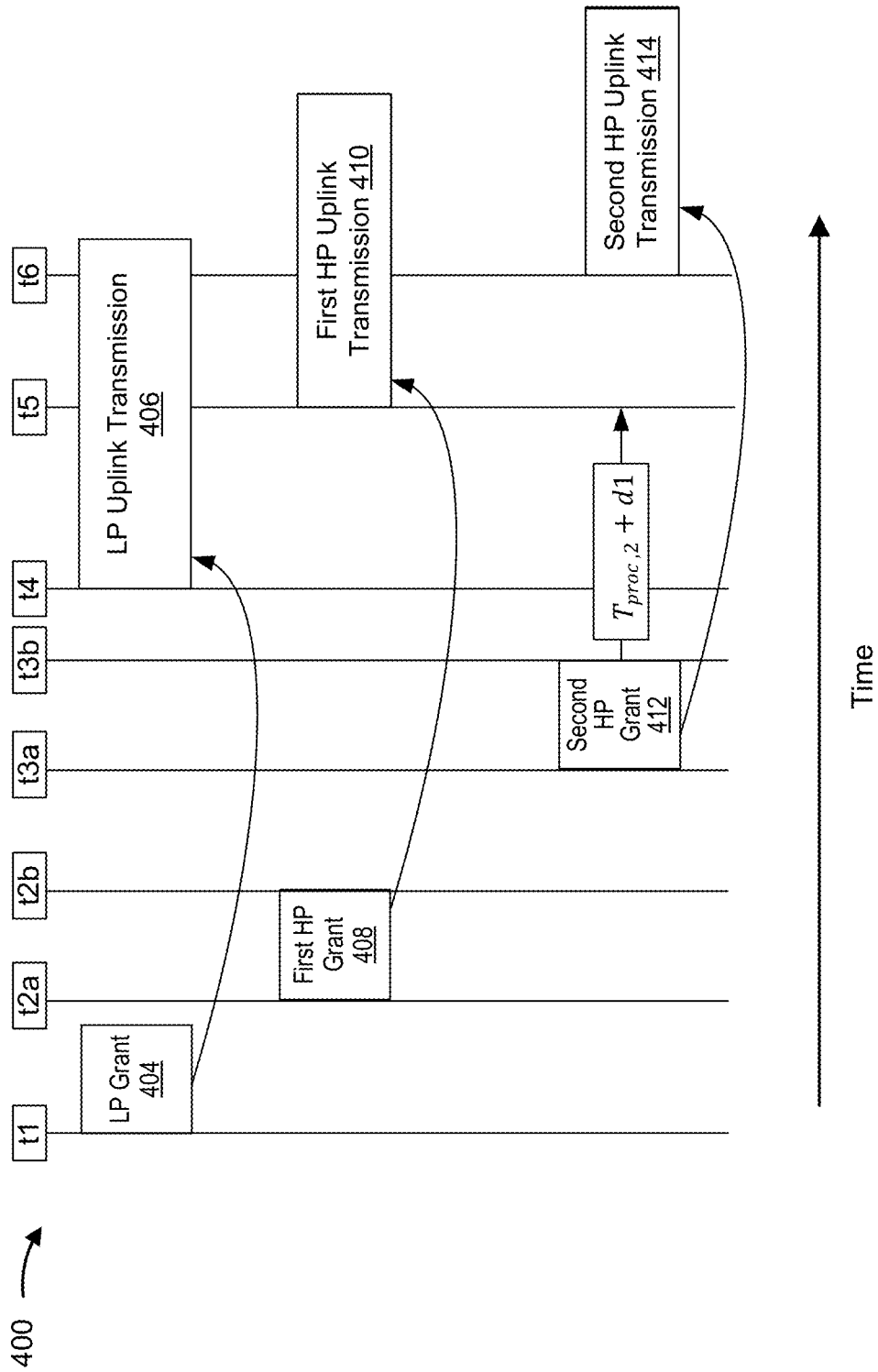
FIGS. 4 and 5 are timing diagrams illustrating exemplary timelines for cancelling a LP uplink transmission colliding with a first HP uplink transmission and a second HP uplink transmission, in accordance with various aspects of the present disclosure.

In some examples, two or more HP uplink transmissions may overlap an LP uplink transmission. In some implementations, an expected transmission time may be determined for one or more of the multiple HP uplink transmissions. FIG. 4 is a timing diagram illustrating an exemplary timeline 400 for a UE cancelling an LP uplink transmission 406 colliding with a first HP uplink transmission 410 and a second HP uplink transmission 414, in accordance with various aspects of the present disclosure. The UE (not shown in FIG. 4) may be an example of a UE 120 as described with reference to FIGS. 1 and 2. As shown in FIG. 4, at time t1, the UE receives an LP grant 404 scheduling an LP uplink transmission 406 at time t4. The LP grant 404 may be LP DCI received in a downlink control channel, such as a PDCCH. Additionally, at time t2a, the UE receives a first HP grant 408 scheduling a first HP uplink transmission 410 at time t5. Furthermore, at time t3a, the UE receives a second HP grant 412 scheduling a second HP uplink transmission 414 at time t6. The first HP grant 408 and the second HP grant 412 may be HP DCIs, respectively, and each HP grant 408, 412 may be received in a downlink control channel, such as the PDCCH.

In the example of FIG. 4, the UE expects the base station will not schedule a transmission of an earliest scheduled HP uplink transmission, such as the first HP uplink transmission 410, to start before a time period, such as $T_{proc,2}$+d1, after a last symbol of latest received HP grant, such as the second HP grant 412. That is, $T_{proc,2}$+d1 may be an example of a time period until an expected transmission time of an HP uplink transmission. As an example, as shown in FIG. 4, the UE expects the base station will not schedule a transmission of the first HP uplink transmission 410 to start before $T_{proc,2}$+d1 (e.g., time t5) after a last symbol of the second HP grant 412. As shown in FIG. 4, the last symbol of the second HP grant 412 occurs at time t3b. The base station (not shown in FIG. 4) may be an example of a base station 110 as described with reference to FIGS. 1 and 2. FIG. 4 is provided as an example and is not drawn to scale. In the example of FIG. 4, the UE may cancel the LP uplink transmission 406 before a first symbol of the first HP uplink transmission 410 overlaps the LP uplink transmission 406. For exemplary purposes, as shown in FIG. 4, the first symbol of the first HP uplink transmission 410 overlaps the LP uplink transmission 406 at time t5. Therefore, the UE may cancel the LP uplink transmission 406 any time before time t5.

In another implementation, the UE expects a transmission of one or more of the HP uplink transmissions 410, 414 will not start before a time period, such as $T_{proc,2}$+d1, after a last symbol of a corresponding HP grant 408, 412. That is, $T_{proc,2}$+d1 may be an example of a time period until an expected transmission time of an HP uplink transmission. As an example, the UE expects the transmission of the first HP uplink transmission 410 will not start before $T_{proc,2}$+d1 after a last symbol of the first HP grant 408. For exemplary purposes, the last symbol of the first HP grant 408 occurs at time t2b. Thus, although not shown in FIG. 4, in this example, time t5 corresponds to $T_{proc,2}$+d1 after a last symbol of the first HP grant 408. Additionally, or alternatively, the UE may expect that transmission of the second HP uplink transmission 414 will not start before $T_{proc,2}$+d1 after a last symbol of the second HP grant 412. For exemplary purposes, the last symbol of the second HP grant 412 occurs at time t3a. Thus, although not shown in FIG. 4, in this example, time t6 corresponds to $T_{proc,2}$+d1 after a last symbol of the second HP grant 412. As described above, the example of FIG. 4, the UE may cancel the LP uplink transmission 406 before a first symbol of the first HP uplink transmission 410 overlaps the LP uplink transmission 406. In some implementations, such as the example of FIG. 4, $T_{proc,2}$ may be determined based on an assumption that a first symbol of a PUSCH allocation consists of DM-RS only, such that $d_{2,1}$=0.

In the example of FIG. 4, the LP uplink transmission 406 may be a PUSCH transmission, the first HP uplink transmission 410 may be a PUCCH transmission, and the second HP uplink transmission 414 may be a PUSCH transmission. According to aspects of the present disclosure, the UE may piggyback the UCI of the first HP uplink transmission 410 on the second HP uplink transmission 414. FIG. 4 illustrates examples of two HP uplink channels overlapping an LP uplink channel. Aspects of the present disclosure are not limited to two HP uplink channels overlapping an LP uplink channel. Aspects of the present disclosure, such as the expected transmission time, as described with respect to FIG. 4, and determining the processing time (e.g., $T_{proc,2}$), as described below. Aspects of the present disclosure may also contemplate scenarios in which one of the multiple HP channels overlaps the LP channel and two or more HP channels overlap each other.

According to aspects of the present disclosure, such as the aspects described with reference to FIG. 4, the PUSCH preparation time ($T_{proc,2}$) may be based on a value of an SCS configuration (μ) corresponding to a smallest SCS configuration of each PDCCH ($μ_{DL}$) carrying a grant (e.g., DCI), such as the first HP grant 408, the second HP grant 412, and the LP grant 404 of FIG. 4, and each PUSCH or PUCCH ($μ_{UL}$) scheduled by a received grant, such as the LP uplink transmission 406, the first HP uplink transmission 410, and the second HP uplink transmission 414 of FIG. 4. For example, if the SCS configurations are zero, one, and two, a value of the SCS configuration (μ) for the PUSCH preparation time ($T_{proc,2}$) may be zero (e.g., the smallest SCS configuration).

Additionally, in some aspects, such as the aspects described with reference to FIG. 4, the UE may consider a processing timing capability (e.g., Cap 1 or Cap 2) of all uplink transmissions, such as all HP uplink transmissions, and use a lowest capability. In some implementations, a second processing timing capability (Cap 2) may be enabled on all uplink carriers for scheduled HP uplink transmissions and scheduled LP uplink transmissions. As an example, a processing Type 2 parameter, such as processingType2Enabled parameter, may be enabled for all serving cells corresponding to the scheduled HP uplink transmissions. In such implementations, a PUSCH preparation time ($N_2$) may correspond to a Cap 2 value. Additionally, based on the PUSCH preparation time ($N_2$) corresponding to a Cap 2 value, a value of the SCS configuration (μ) may also correspond to a Cap 2 value. Alternatively, a first processing timing capability (Cap 1) may be enabled on one or more uplink carriers for the scheduled HP uplink transmissions. In such implementations, the PUSCH preparation time ($N_2$) may be correspond to a Cap 1 value. In some examples, based on the PUSCH preparation time ($N_2$) corresponding to a Cap 1 value, a value of the SCS configuration ($\mu$) may also correspond to a Cap 1 value.

Figure 5:
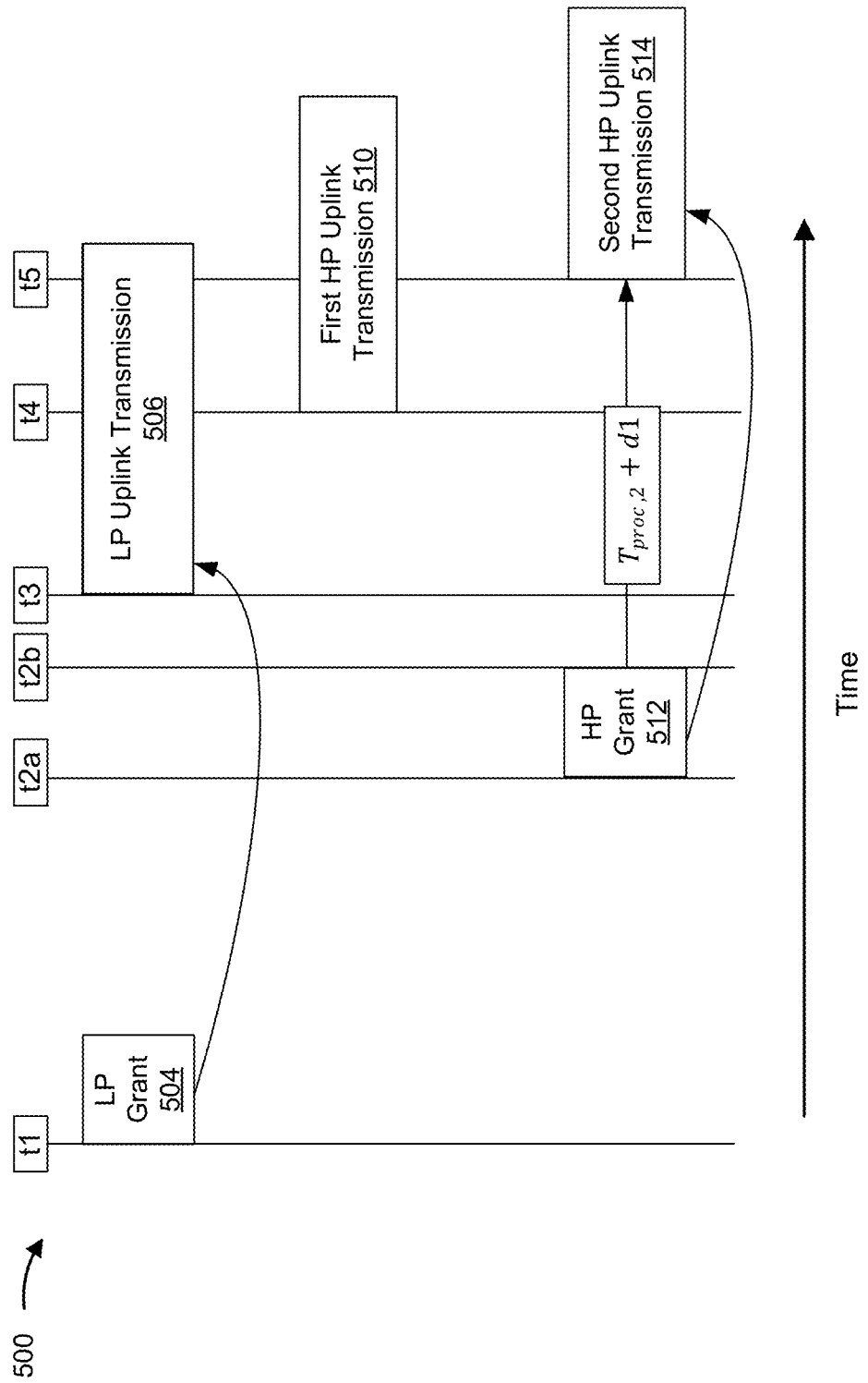

In some examples, an HP uplink transmission may be scheduled without a corresponding grant. FIG. 5 is a timing diagram illustrating an exemplary timeline 500 for a UE cancelling an LP uplink transmission 506 colliding with a first HP uplink transmission 510 and a second HP uplink transmission 514, in accordance with various aspects of the present disclosure. The UE (not shown in FIG. 5) may be an example of a UE 120 as described with reference to FIGS. 1 and 2. As shown in FIG. 5, at time t1, the UE receives, from a base station, an LP grant 504 scheduling an LP uplink transmission 506 at time t4. The LP grant 504 may be LP DCI received in a downlink control channel, such as a PDCCH. Additionally, at time t2a, the UE receives an HP grant 512 scheduling a second HP uplink transmission 514 at time t5. The HP grant 512 may be HP DCI received in a downlink control channel, such as the PDCCH. The base station (not shown in FIG. 5) may be an example of a base station 110 as described with reference to FIGS. 1 and 2.

In the example of FIG. 5, a first HP uplink transmission 510 scheduled at time t4 may be an example of an uplink transmission that is scheduled without a corresponding dynamic grant, such as the HP grant 512. Examples of an uplink transmission that is scheduled without a corresponding dynamic grant include, but are not limited to, type 1 or type 2 uplink configured grants, scheduling request (SR) transmissions, or hybrid automatic repeat request (HARD)-acknowledgement (ACK) reports for semi-persistent (SPS) physical downlink shared channel (PDSCH). A HARQ-ACK report for an SPS PDSCH may be an example of a HARQ-ACK report transmitted in response to a received PDSCH without a corresponding PDCCH. In one example, the first HP uplink transmission 510 may be a HARQ-ACK report for an SPS PDSCH.

In some examples, such as the example of FIG. 5, due to the absence of the dynamic grant, a base station may not the dynamic grant when determining an expected transmission time for the first HP uplink transmission 510. Additionally, the SCS ($\mu_{DL}$) value for the grant ($\mu_{DL}$) of the grantless HP uplink transmission may not be considered when determining the SCS value ($\mu$) for the $T_{proc,2}$, as described with reference to FIG. 4. For ease of explanation, an HP uplink transmission that does not correspond to a grant (e.g., PDCCH) may be referred to as a grantless HP uplink transmission. In such examples, the UE may cancel the LP uplink transmission before a first symbol of a grantless HP uplink transmission overlaps the LP uplink transmission if the grantless HP uplink transmission is an earliest HP uplink transmission from a set of HP uplink transmissions scheduled in a slot. In the example of FIG. 5, the the first HP uplink transmission 510 is the earliest HP uplink transmission from the set of HP uplink transmissions 510, 514 scheduled in a slot. Therefore, the UE may cancel the LP uplink transmission 506 before the first symbol of the first HP uplink transmission 510 overlaps the LP uplink transmission 506 at time t4. Additionally, as shown in FIG. 5, the UE may expect a transmission of the second HP uplink transmission 514 will not start before $T_{proc,2}$+d1 (e.g., before time t5) after a last symbol of the HP grant 512. In the example of FIG. 5, the last symbol of the HP grant 512 occurs at time t2b.

As indicated above, FIGS. 3, 4, and 5 are provided as examples. Other examples may differ from what is described with respect to FIGS. 3, 4, and 5.

Figure 6:
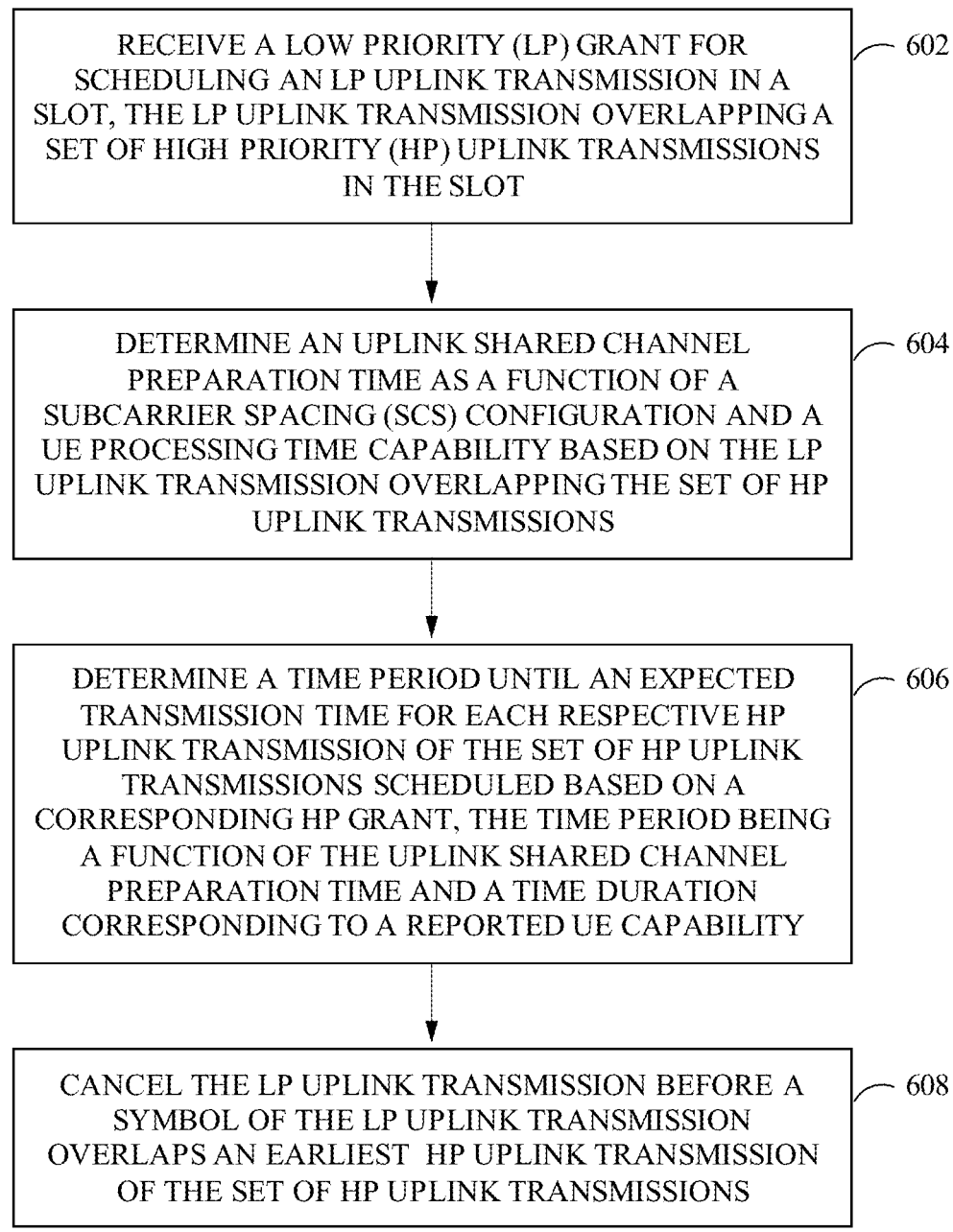
FIG. 6 is a diagram illustrating an example process performed at a UE that supports canceling an LP uplink transmission before an initial symbol of an HP uplink transmission overlaps the LP uplink transmission, in accordance with various aspects of the present disclosure.

FIG. 6 is a diagram illustrating an example process performed at a UE that supports canceling an LP uplink transmission before an initial symbol of an HP uplink transmission overlaps the LP uplink transmission, in accordance with various aspects of the present disclosure. The operations of the process 600 may be implemented by a UE, such as a UE 120, or its components, as described with reference to FIGS. 1, 2, 3, 4, and 5, respectively. For example, operations of the process 600 may be performed by an uplink (UL) timeline module 140 as described with reference to FIG. 1. In some examples, a UE may execute a set of instructions to control the functional elements of the UE to perform the operations or functions described below. Additionally, or alternatively, a UE may perform aspects of the operations or functions described below using special-purpose hardware.

In block 602, the process 600 may receive an LP grant for scheduling an LP uplink transmission in a slot. In some examples, such as the examples described in reference to FIGS. 3-6, the LP uplink transmission overlaps a set of HP uplink transmissions in the slot. The HP uplink transmissions may include one or both of control channel (e.g., PUCCH) or data channel (e.g., PUSCH) transmissions. At block 604, the process 600 may determine an uplink shared channel preparation time as a function of an SCS configuration and a UE processing time capability based on the LP uplink transmission overlapping the set of HP uplink transmissions. As described, the uplink shared channel (e.g., PUSCH) preparation time ($T_{proc,2}$) may be a minimum time for a UE to prepare an uplink transmission, such as a PUSCH transmission, in a wireless communication system, such as an NR system. In some examples, the PUSCH preparation time ($T_{proc,2}$) may be determined based on a subcarrier spacing (SCS) configuration ($\mu$) and also a PUSCH preparation time ($N_2$) of the uplink carrier on which the uplink transmission is scheduled. The SCS configuration ($\mu$) may be determined based on an SCS configuration ($\mu_{DL}$) of a downlink channel, such as a physical downlink control channel (PDCCH), including a grant and an SCS configuration ($\mu_{UL}$) of an uplink transmission scheduled based on the grant.

As shown in FIG. 6, at block 606, the process 600 determines a time period until an expected transmission time for each respective HP uplink transmission of the set of HP uplink transmissions scheduled based on a corresponding HP grant. The time period may be a function of the uplink shared channel preparation time and a time duration corresponding to a reported UE capability. As shown in FIG. 6, at block 606, the process 600 determines a time period until an expected transmission time for each respective HP uplink transmission of the set of HP uplink transmissions scheduled based on a corresponding HP grant. The time period may be a function of the uplink shared channel preparation time and a time duration corresponding to a reported UE capability. For example, as described with reference to FIG. 3, an expected transmission time for an HP uplink transmission may be based on the PUSCH preparation time ($T_{proc,2}$) and a reported UE capability (d1). In some examples, the reported UE capability (d1) may be a time duration corresponding to 0, 1, or 2 symbols reported by the UE capability. In some implementations, the UE expects the transmission of the HP uplink transmission will not start before $T_{proc,2}$+d1 after a last symbol of a grant scheduling the HP uplink transmission. In such implementations, the PUSCH preparation time ($T_{proc,2}$) may be determined based on an assumption that a first symbol of a PUSCH allocation only includes a demodulation reference signal (DM-RS) (e.g., the DM-RS is front-loaded), such that $d_{2,1}=0$.

Additionally, as shown in FIG. 6, at block 608, the process 600 may cancel the LP uplink transmission before a symbol of the LP uplink transmission overlaps an earliest HP uplink transmission of the set of HP uplink transmissions. For example, as described in reference to FIG. 4, the LP uplink transmission 406 is cancelled at a time before time t5, where time t5 corresponds to a time when a symbol of the LP uplink transmission overlaps the first HP uplink transmission 410. In the example of FIG. 4, the first HP uplink transmission 410 is an earliest HP uplink transmission of the set of HP uplink transmissions 410, 414.

Figure 7:
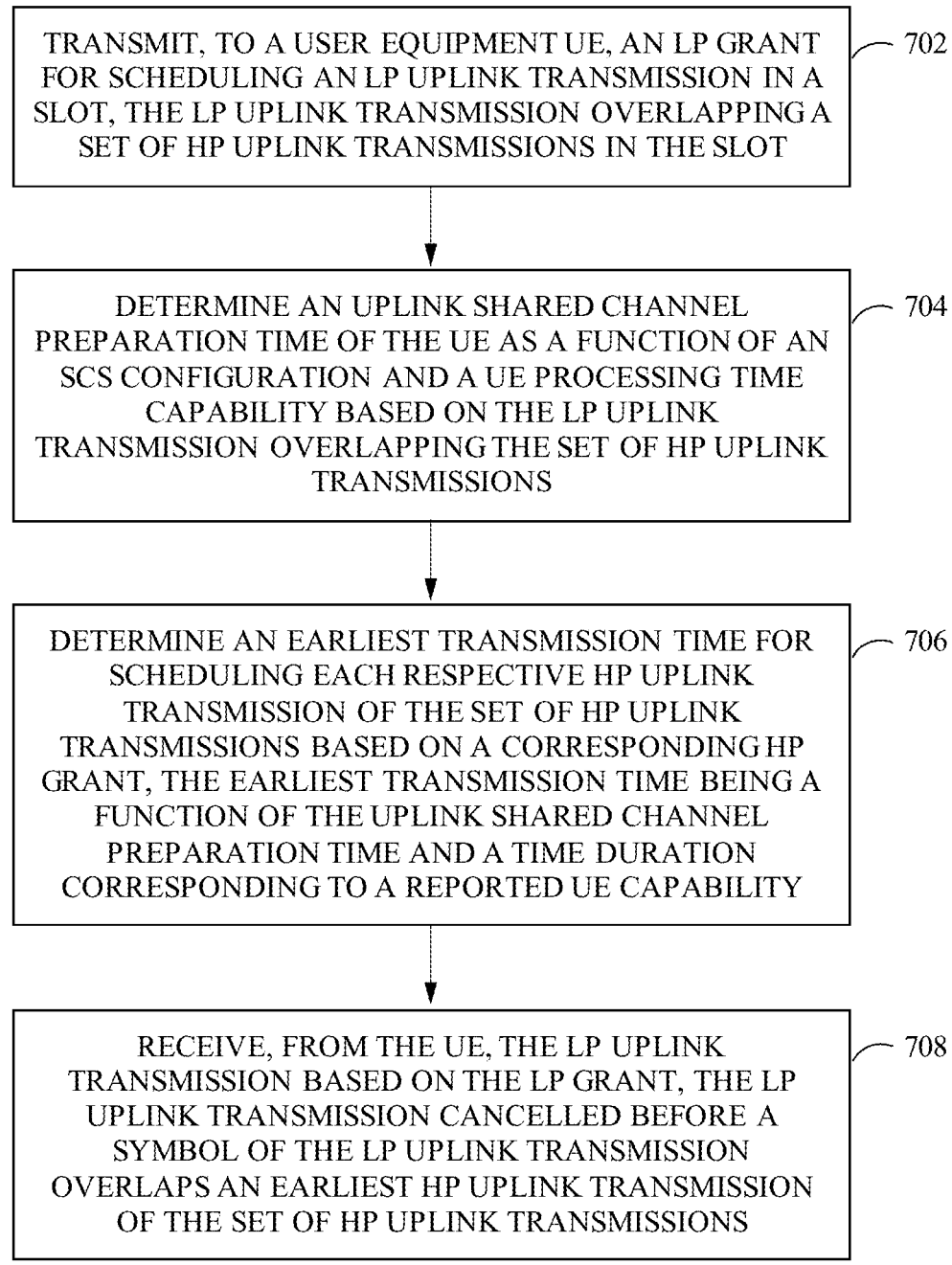
FIG. 7 is a diagram illustrating an example process performed at a base station that supports an LP uplink transmission being cancelled before an initial symbol of an HP uplink transmission overlaps the LP uplink transmission, in accordance with various aspects of the present disclosure.

FIG. 7 is a diagram illustrating an example process performed at a base station that supports an LP uplink transmission being cancelled before an initial symbol of an HP uplink transmission overlaps the LP uplink transmission, in accordance with various aspects of the present disclosure. The operations of the process 700 may be implemented by a base station, such as a base station 110, or its components, as described with reference to FIGS. 1, 2, 3, 4, and 5, respectively. For example, operations of the process 700 may be performed by a UE timeline module 138 as described with reference to FIG. 1. In some examples, a base station may execute a set of instructions to control the functional elements of the base station to perform the operations or functions described below. Additionally, or alternatively, a base station may perform aspects of the operations or functions described below using special-purpose hardware.

In block 702, the process 700 may transmit, to a UE, an LP grant for scheduling an LP uplink transmission in a slot. The LP uplink transmission may overlap a set of HP uplink transmissions in the slot. At block 704, the process 700 determines an uplink shared channel preparation time of the UE as a function of an SCS configuration and a UE processing time capability based on the LP uplink transmission overlapping the set of HP uplink transmissions. In some examples, the PUSCH preparation time ($T_{proc,2}$) may be determined based on a subcarrier spacing (SCS) configuration ($\mu$) and also a PUSCH preparation time ($N_2$) of the uplink carrier on which the uplink transmission is scheduled. The SCS configuration ($\mu$) may be determined based on an SCS configuration ($\mu_{DL}$) of a downlink channel, such as a physical downlink control channel (PDCCH), including a grant and an SCS configuration ($\mu_{UL}$) of an uplink transmission scheduled based on the grant.

At block 706, the process 700 may determine an earliest transmission time for scheduling each respective HP uplink transmission of the set of HP uplink transmissions based on a corresponding HP grant. The earliest transmission time may be a function of the uplink shared channel preparation time and a time duration corresponding to a reported UE capability. For example, as described with reference to FIG. 3, the earliest transmission time for an HP uplink transmission may be based on the PUSCH preparation time ($T_{proc,2}$) and a reported UE capability (d1). At block 708, the process receives, from the UE, the LP uplink transmission based on the LP grant, the LP uplink transmission cancelled before a symbol of the LP uplink transmission overlaps an earliest HP uplink transmission of the set of HP uplink transmissions.

Implementation examples are described in the following numbered clauses:

1. A method for wireless communications performed by a user equipment (UE), comprising: receiving a low priority (LP) grant for scheduling an LP uplink transmission in a slot, the LP uplink transmission overlapping a set of high priority (HP) uplink transmissions in the slot; determining an uplink shared channel preparation time as a function of a subcarrier spacing (SCS) configuration and a UE processing time capability based on the LP uplink transmission overlapping the set of HP uplink transmissions; determining a time period until an expected transmission time for each respective HP uplink transmission of the set of HP uplink transmissions scheduled based on a corresponding HP grant, the time period being a function of the uplink shared channel preparation time and a time duration corresponding to a reported UE capability; and canceling the LP uplink transmission before a symbol of the LP uplink transmission overlaps an earliest HP uplink transmission of the set of HP uplink transmissions.

2. The method of Clause 1, further comprising receiving a set of high priority (HP) grants for scheduling the set of HP uplink transmissions in the slot, each respective HP grant of the set of HP grants corresponding to different HP uplink transmission of the set of HP uplink transmissions.

3. The method of any of Clauses 1-2, in which the time period until the expected transmission time for each respective HP uplink transmission of the set of HP uplink transmissions scheduled based on the corresponding HP grant is initiated after a last symbol of the corresponding HP grant.

4. The method of any of Clauses 1-3, further comprising transmitting each respective HP uplink transmission of the set of HP uplink transmissions scheduled based on the corresponding HP grant no earlier than the expected transmission time.

5. The method of any of Clauses 1-4, in which the SCS configuration corresponds to a smallest SCS configuration selected from one of a set of first SCS configurations, a set of second SCS configurations, a third SCS configuration, and a fourth SCS configuration.

6. The method of Clause 5, in which: each first SCS configuration of the set of first SCS configurations is associated with a different HP uplink grant of a set of HP uplink grants corresponding to a set of HP uplink transmissions; and each second SCS configuration of the second SCS configurations is associated with a different HP uplink transmission of the set of HP uplink transmissions.

7. The method of Clause 5, in which: the third SCS configuration is associated with the LP grant; and the fourth SCS configuration is associated with the LP uplink transmission.

8. The method of any of Clauses 1-7, in which the UE processing time capability is processing time capability 2 when each HP uplink transmission of the set of HP uplink transmissions corresponds to processing time capability 2, a value of the uplink shared channel preparation time for processing time capability 2 being less than a value of the uplink shared channel preparation time for processing time capability 1.

9. The method of any of Clauses 1-7, in which the UE processing time capability is processing time capability 1 when one HP uplink transmission of the set of HP uplink transmissions corresponds to processing time capability 1.

10. The method of any of Clauses 1-9, in which the earliest HP uplink transmission is a grantless HP uplink transmission comprising HARQ-ACK information generated based on a downlink shared channel received without a corresponding downlink control channel.

11. The method of any of Clauses 1-9, in which the earliest HP uplink transmission is a grantless HP uplink transmission comprising a scheduling request (SR).

12. The method of any of Clauses 1-9, in which the earliest HP uplink transmission is a grantless HP uplink transmission generated based on a configured grant.

13. The method of any of Clauses 1-12, in which the UE assumes a first symbol of the LP uplink transmission is limited to including demodulation reference signals (DM-RS).

14. A method for wireless communications performed by a base station, comprising: transmitting, to a user equipment (UE), a low priority (LP) grant for scheduling an LP uplink transmission in a slot, the LP uplink transmission overlapping a set of high priority (HP) uplink transmissions in the slot; determining an uplink shared channel preparation time of the UE as a function of a subcarrier spacing (SCS) configuration and a UE processing time capability based on the LP uplink transmission overlapping the set of HP uplink transmissions; determining an earliest transmission time for scheduling each respective HP uplink transmission of the set of HP uplink transmissions based on a corresponding HP grant, the earliest transmission time being a function of the uplink shared channel preparation time and a time duration corresponding to a reported UE capability; and receiving, from the UE, the LP uplink transmission based on the LP grant, the LP uplink transmission cancelled before a symbol of the LP uplink transmission overlaps an earliest HP uplink transmission of the set of HP uplink transmissions.

15. The method of Clause 14, further comprising transmitting a set of high priority (HP) grants for scheduling the set of HP uplink transmissions in the slot, each respective HP grant of the set of HP grants corresponding to different HP uplink transmission of the set of HP uplink transmissions.

16. The method of any of Clauses 14-15, in which the earliest transmission time for each respective HP uplink transmission of the set of HP uplink transmissions is an end of a time period initiated after a last symbol of the corresponding HP grant.

17. The method of any of Clauses 14-16, further comprising receiving each respective HP uplink transmission of the set of HP uplink transmissions no earlier than the earliest transmission time.

18. The method of any of Clauses 14-17, in which the SCS configuration is a smallest SCS configuration corresponding to one of a set of first SCS configurations, a set of second SCS configurations, a third SCS configuration, and a fourth SCS configuration.

19. The method of Clause 18, in which: each first SCS configuration of the set of first SCS configurations is associated with a different HP uplink grant of a set of HP uplink grants corresponding to a set of HP uplink transmissions; and each second SCS configuration of the second SCS configurations is associated with a different HP uplink transmission of the set of HP uplink transmissions.

20. The method of Clause 18, in which: the third SCS configuration is associated with the LP uplink grant; and the fourth SCS configuration is associated with the LP uplink transmission.

21. The method of any of Clauses 14-20, in which the UE processing time capability is processing time capability 2 when each HP uplink transmission of the set of HP uplink transmissions corresponds to processing time capability 2, a value of the uplink shared channel preparation time for processing time capability 2 being less than a value of the uplink shared channel preparation time for processing time capability 1.

22. The method of any of Clauses 14-20, in which the UE processing time capability is processing time capability 1 when one HP uplink transmission of the set of HP uplink transmissions corresponds to processing time capability 1.

23. The method of any of Clauses 14-22, in which the earliest HP uplink transmission is a grantless HP uplink transmission comprising HARQ-ACK information generated based on a downlink shared channel transmitted without a corresponding downlink control channel.

24. The method of any of Clauses 14-22, in which the earliest HP uplink transmission is a grantless HP uplink transmission comprising a scheduling request (SR).

25. The method of any of Clauses 14-22, in which the earliest HP uplink transmission is a grantless HP uplink transmission generated based on a configured grant.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such.

Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communications performed by a user equipment (UE), comprising:
   receiving a low priority (LP) grant, via downlink control information (DCI), for scheduling an LP uplink transmission in a slot, the LP uplink transmission overlapping a set of high priority (HP) uplink transmissions in the slot, each HP uplink transmission being scheduled via a respective second DCI;
   determining an uplink shared channel preparation time as a function of a subcarrier spacing (SCS) configuration and a UE processing time capability based on the LP uplink transmission overlapping the set of HP uplink transmissions, the SCS configuration corresponding to a smallest SCS configuration selected from a first SCS configuration associated with an HP grant corresponding to an HP uplink transmission of the set of HP uplink transmissions, a second SCS configuration associated with the HP uplink transmission of the set of HP uplink transmissions, a third SCS configuration associated with the LP grant, and a fourth SCS configuration associated with the LP uplink transmission;
   determining a time period until a respective expected transmission time for each HP uplink transmission of the set of HP uplink transmissions scheduled based on a corresponding HP grant, the time period being a function of the uplink shared channel preparation time and a time duration corresponding to a reported UE capability; and
   canceling the LP uplink transmission before a symbol of the LP uplink transmission overlaps an earliest HP uplink transmission of the set of HP uplink transmissions, the earliest HP uplink transmission being based on the time period.

2. The method of claim 1, further comprising receiving a set of high priority (HP) grants for scheduling the set of HP uplink transmissions in the slot, each HP grant of the set of HP grants corresponding to different HP uplink transmission of the set of HP uplink transmissions.

3. The method of claim 2, in which the time period until the respective expected transmission time for each HP uplink transmission of the set of HP uplink transmissions scheduled based on the corresponding HP grant is initiated after a last symbol of the corresponding HP grant.

4. The method of claim 3, further comprising transmitting each HP uplink transmission of the set of HP uplink transmissions scheduled based on the corresponding HP grant no earlier than the respective expected transmission time.

5. The method of claim 1, in which the UE processing time capability is processing time capability 2 when each HP uplink transmission of the set of HP uplink transmissions corresponds to processing time capability 2, a value of the uplink shared channel preparation time for processing time capability 2 being less than a value of the uplink shared channel preparation time for processing time capability 1.

6. The method of claim 1, in which the UE processing time capability is processing time capability 1 when one HP uplink transmission of the set of HP uplink transmissions corresponds to processing time capability 1.

7. The method of claim 1, in which the earliest HP uplink transmission is a grantless HP uplink transmission comprising HARQ-ACK information generated based on a downlink shared channel received without a corresponding downlink control channel.

8. The method of claim 1, in which the earliest HP uplink transmission is a grantless HP uplink transmission comprising a scheduling request (SR).

9. The method of claim 1, in which the UE assumes a first symbol of the LP uplink transmission is limited to including demodulation reference signals (DM-RS).

10. The method of claim 1, in which the overlap occurs after the time period until the respective expected transmission time of the earliest HP uplink transmission.

11. An apparatus for wireless communications at a user equipment (UE), comprising:
   a processor;
   a memory coupled with the processor; and
   instructions stored in the memory and operable, when executed by the processor, to cause the apparatus to:
      receive a low priority (LP) grant, via downlink control information (DCI), for scheduling an LP uplink transmission in a slot, the LP uplink transmission overlapping a set of high priority (HP) uplink transmissions in the slot, each HP uplink transmission being scheduled via a respective second DCI;
      determine an uplink shared channel preparation time as a function of a subcarrier spacing (SCS) configuration and a UE processing time capability based on the LP uplink transmission overlapping the set of HP uplink transmissions, the SCS configuration corresponding to a smallest SCS configuration selected from a first SCS configuration associated with an HP grant corresponding to an HP uplink transmission of the set of HP uplink transmissions, a second SCS configuration associated with the HP uplink transmission of the set of HP uplink transmissions, a third SCS configuration associated with the LP grant, and a fourth SCS configuration associated with the LP uplink transmission;
      determine a time period until a respective expected transmission time for each HP uplink transmission of the set of HP uplink transmissions scheduled based on a corresponding HP grant, the time period being a function of the uplink shared channel preparation time and a time duration corresponding to a reported UE capability; and
      cancel the LP uplink transmission before a symbol of the LP uplink transmission overlaps an earliest HP uplink transmission of the set of HP uplink transmissions, the earliest HP uplink transmission being based on the time period.

12. The apparatus of claim 11, in which:
   execution of the instructions further cause the apparatus to receive a set of high priority (HP) grants for scheduling the set of HP uplink transmissions in the slot,
   each HP grant of the set of HP grants corresponding to different HP uplink transmission of the set of HP uplink transmissions; and
   the time period until the respective expected transmission time for each HP uplink transmission of the set of HP uplink transmissions scheduled based on the corresponding HP grant is initiated after a last symbol of the corresponding HP grant.

13. A method for wireless communications performed by a base station, comprising:
  transmitting, to a user equipment (UE), a low priority (LP) grant, via downlink control information (DCI), for scheduling an LP uplink transmission in a slot, the LP uplink transmission overlapping a set of high priority (HP) uplink transmissions in the slot, each HP uplink transmission being scheduled via a respective second DCI;
  determining an uplink shared channel preparation time of the UE as a function of a subcarrier spacing (SCS) configuration and a UE processing time capability based on the LP uplink transmission overlapping the set of HP uplink transmissions, the SCS configuration corresponding to a smallest SCS configuration selected from a first SCS configuration associated with an HP grant corresponding to an HP uplink transmission of the set of HP uplink transmissions, a second SCS configuration associated with the HP uplink transmission of the set of HP uplink transmissions, a third SCS configuration associated with the LP grant, and a fourth SCS configuration associated with the LP uplink transmission;
  determining a respective earliest transmission time for each HP uplink transmission of the set of HP uplink transmissions based on a corresponding HP grant, the respective earliest transmission time being a function of the uplink shared channel preparation time and a time duration corresponding to a reported UE capability; and
  receiving, from the UE, the LP uplink transmission based on the LP grant, the LP uplink transmission cancelled before a symbol of the LP uplink transmission overlaps an earliest HP uplink transmission of the set of HP uplink transmissions.

14. The method of claim 13, further comprising transmitting a set of high priority (HP) grants for scheduling the set of HP uplink transmissions in the slot, each HP grant of the set of HP grants corresponding to different HP uplink transmission of the set of HP uplink transmissions.

15. The method of claim 14, in which the respective earliest transmission time for each HP uplink transmission of the set of HP uplink transmissions is an end of a time period initiated after a last symbol of the corresponding HP grant.

16. The method of claim 15, further comprising receiving each HP uplink transmission of the set of HP uplink transmissions no earlier than the respective earliest transmission time.

17. The method of claim 13, in which the UE processing time capability is processing time capability 2 when each HP uplink transmission of the set of HP uplink transmissions corresponds to processing time capability 2, a value of the uplink shared channel preparation time for processing time capability 2 being less than a value of the uplink shared channel preparation time for processing time capability 1.

18. The method of claim 13, in which the UE processing time capability is processing time capability 1 when one HP uplink transmission of the set of HP uplink transmissions corresponds to processing time capability 1.

19. The method of claim 13, in which the earliest HP uplink transmission is a grantless HP uplink transmission comprising HARQ-ACK information generated based on a downlink shared channel transmitted without a corresponding downlink control channel.

20. The method of claim 13, in which the earliest HP uplink transmission is a grantless HP uplink transmission comprising a scheduling request (SR).

21. The method of claim 13, in which the overlap occurs after the respective earliest transmission time of the earliest HP uplink transmission.

22. An apparatus for wireless communications at a base station, comprising:
  a processor;
  a memory coupled with the processor; and
  instructions stored in the memory and operable, when executed by the processor, to cause the apparatus to:
    transmit, to a user equipment (UE), a low priority (LP) grant, via downlink control information (DCI), for scheduling an LP uplink transmission in a slot, the LP uplink transmission overlapping a set of high priority (HP) uplink transmissions in the slot, each HP uplink transmission being scheduled via a respective second DCI;
    determine an uplink shared channel preparation time of the UE as a function of a subcarrier spacing (SCS) configuration and a UE processing time capability based on the LP uplink transmission overlapping the set of HP uplink transmissions, the SCS configuration corresponding to a smallest SCS configuration selected from a first SCS configuration associated with an HP grant corresponding to an HP uplink transmission of the set of HP uplink transmissions, a second SCS configuration associated with the HP uplink transmission of the set of HP uplink transmissions, a third SCS configuration associated with the LP grant, and a fourth SCS configuration associated with the LP uplink transmission;
    determine a respective earliest transmission time for each HP uplink transmission of the set of HP uplink transmissions based on a corresponding HP grant, the respective earliest transmission time being a function of the uplink shared channel preparation time and a time duration corresponding to a reported UE capability; and
    receive, from the UE, the LP uplink transmission based on the LP grant, the LP uplink transmission cancelled before a symbol of the LP uplink transmission overlaps an earliest HP uplink transmission of the set of HP uplink transmissions.

23. The apparatus of claim 22, in which:
  execution of the instructions further cause the apparatus to transmit a set of high priority (HP) grants for scheduling the set of HP uplink transmissions in the slot;
  each HP grant of the set of HP grants corresponding to different HP uplink transmission of the set of HP uplink transmissions; and
  the respective earliest transmission time for each HP uplink transmission of the set of HP uplink transmissions is an end of a time period initiated after a last symbol of the corresponding HP grant.

24. The apparatus of claim 23, in which execution of the instructions further cause the apparatus to receive each HP uplink transmission of the set of HP uplink transmissions no earlier than the respective earliest transmission time.

* * * * *